(12) United States Patent
Helliker et al.

(10) Patent No.: US 8,171,247 B2
(45) Date of Patent: May 1, 2012

(54) METHOD FOR BACKUP STORAGE DEVICE SELECTION

(75) Inventors: Fabrice Helliker, Broadstone (GB); Simon Chappell, Moordown (GB); Lawrence Barnes, Verwood (GB)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

(21) Appl. No.: 13/022,858

(22) Filed: Feb. 8, 2011

(65) Prior Publication Data

US 2012/0036331 A1     Feb. 9, 2012

Related U.S. Application Data

(63) Continuation of application No. 10/846,609, filed on May 14, 2004, now Pat. No. 7,913,043.

(51) Int. Cl.
*G06F 12/16* (2006.01)
(52) U.S. Cl. .......... 711/162; 711/161; 714/6.1; 714/6.2; 714/6.23
(58) Field of Classification Search .......... 711/161, 711/162; 714/6.1, 6.2, 6.23
See application file for complete search history.

(56) References Cited

U.S. PATENT DOCUMENTS

| | | | |
|---|---|---|---|
| 5,790,886 A | 8/1998 | Allen | |
| 5,819,020 A | 10/1998 | Beeler, Jr. | |
| 5,966,730 A | 10/1999 | Zulch | |
| 5,974,563 A | 10/1999 | Beeler, Jr. | |
| 6,199,146 B1 | 3/2001 | Pence | |
| 6,205,527 B1 | 3/2001 | Goshey et al. | |
| 6,298,439 B1 | 10/2001 | Beglin | |
| 6,434,681 B1 | 8/2002 | Amangau | |
| 6,668,310 B2 * | 12/2003 | McKenney | 711/147 |
| 6,854,034 B1 | 2/2005 | Kitamura et al. | |
| 7,146,522 B1 | 12/2006 | Rowe et al. | |
| 7,194,491 B2 | 3/2007 | Inagaki | |
| 7,302,498 B2 | 11/2007 | Tanaka | |
| 7,415,490 B2 | 8/2008 | Takeda et al. | |
| 2001/0034795 A1 | 10/2001 | Moulton et al. | |
| 2003/0018656 A1 | 1/2003 | Schutzman et al. | |
| 2003/0046270 A1 | 3/2003 | Leung et al. | |
| 2003/0079018 A1 | 4/2003 | Lolayekar et al. | |
| 2003/0120751 A1 | 6/2003 | Husain et al. | |
| 2003/0177149 A1 | 9/2003 | Coombs | |
| 2003/0187973 A1 | 10/2003 | Wesley | |
| 2003/0233281 A1 | 12/2003 | Takeuchi et al. | |
| 2004/0034672 A1 | 2/2004 | Inagaki | |
| 2004/0064633 A1 | 4/2004 | Oota | |

(Continued)

FOREIGN PATENT DOCUMENTS

JP        7044429        2/1995

(Continued)

OTHER PUBLICATIONS http://search390.techtarget.com, "NDMP", New York Consolid8, Apr. 26-28, 2004 (1 page).

*Primary Examiner* — Jae Yu
(74) *Attorney, Agent, or Firm* — Knobbe Martens Olson & Bear, LLP

(57) ABSTRACT

A method and system for backing up computer data uses a network device to select a storage device in a manner that enhances at least one parameter associated with the backup process.

20 Claims, 5 Drawing Sheets

U.S. PATENT DOCUMENTS

| | | |
|---|---|---|
| 2004/0181641 A1 | 9/2004 | Nguyen et al. |
| 2004/0186881 A1 | 9/2004 | Porter et al. |
| 2004/0245547 A1 | 12/2004 | Stipe |
| 2005/0081006 A1 | 4/2005 | Shackleford et al. |
| 2005/0125467 A1 | 6/2005 | Oosaki et al. |
| 2006/0036908 A1 | 2/2006 | Helliker et al. |
| 2008/0276061 A1* | 11/2008 | Takaoka et al. ............... 711/170 |
| 2008/0320254 A1* | 12/2008 | Wingard et al. ............... 711/157 |
| 2009/0063727 A1* | 3/2009 | Nakamura et al. ............. 710/29 |
| 2009/0094481 A1* | 4/2009 | Vera et al. ....................... 714/11 |

FOREIGN PATENT DOCUMENTS

| | | |
|---|---|---|
| JP | 2000137636 | 5/2000 |
| JP | 2004005068 | 1/2004 |
| WO | WO 2008/040444 | 4/2008 |

\* cited by examiner

METHOD FOR BACKUP STORAGE DEVICE SELECTION

This patent application is a continuation of and claims priority from U.S. patent application Ser. No. 10/846,609, filed on May 14, 2004 now U.S. Pat. No. 7,913,043. U.S. patent application Ser. No. 10/846,609 is incorporated herein by reference in its entirety.

FIELD OF THE INVENTION

The present invention relates generally to computer backup systems. The present invention relates more particularly to a computer backup system that automatically selects the storage device to be used to backup a computer, such that predetermined criteria regarding the backup process tend to be optimized.

BACKGROUND OF THE INVENTION

Backup systems for computers are well known. Backup systems provide for the redundant storage of data, so that a computer can be restored to a previous state after an event that results in the loss of data on the computer. As those skilled in the art will appreciate, data stored on a computer can be very valuable and the loss of data can result in severe economic hardship.

Banks, stock brokerages, and other companies commonly store large amounts of data on computers. This data is vital to the day-to-day operations of such businesses. For example, it is easy to appreciate that a bank's account records, which are commonly stored in a computer, are necessary in order to facilitate the regular business transactions of the bank.

Events such as fires, earthquakes, thefts, and hard disk failures may result in the loss of valuable computer data. If the only copy of a company's data is stored on the affected computer, then the loss may be permanent and may have catastrophic consequences.

However, if the data was previously backed up, then the data may be restored, so that the routine operations of the business may continue with a minimum of disruption. Thus, the backing up of data stored on computers is considered necessary and has generally become routine.

Backup systems typically comprise a storage device and software, which drives the storage device. The software is configured so as to copy all or a portion of the data from a computer to media of the storage device. Various different types of storage devices are in widespread use. Compact disc (CD) and digital virtual device (DVD or DVD-ROM) backup systems are common on computers with smaller data storage requirements. Tape storage devices are used on computers with large data storage requirements.

The networking of computers had, for a time, simplified the backup process by providing a central data storage location for multiple computers. That is, several client computers were commonly connected to a single server and all of the data used by the client computers was stored in a central location by the server. Thus, only the single server needed to be backed up in order to adequately safeguard the data used by all of the client computers.

However, as the data needs of client computers increased over time, the ability to transfer the required data between the client and host eventually became bottlenecked by the limited bandwidth of the network. Since the data storage capacity of the client computers continued to increase as hard disk capacities increased and hard disk costs decreased, it eventually became more practical to store the large amounts of data required by client computers at the client computers themselves, rather than at the servers where bandwidth restrictions would limit the client computer's access to the data. Thus, we are once again faced with having to backup multiple client computers.

Although sometimes the client computers may be able to backup onto CD or DVD media, many times the capacity of such media is insufficient. Further, the backup process cannot be as fully automated when CD or DVD media are utilized, since more frequent media changes are required as compared to tape backup. When the backup process is not fully automated, then backups may not be performed as frequently as desired and the risk of loss of data undesirably increases.

Hard disk storage devices are also used for backups. However, hard disks are comparatively expensive on a per gigabyte basis, are prone to failure, and have limited capacity.

Contemporary networks typically have tape storage devices so that the client computers can backup thereto in an automated and efficient manner. Larger networks may have multiple tape storage devices, as well as CD, DVD and/or hard disk storage devices. For example, one tape storage device may be located near the server or servers, while one or more tape, CD, DVD, or hard disk storage devices may be located near individual client computers.

Thus, in a contemporary network, data may sometimes be backed up on any selected one of a plurality of different storage devices at a plurality of different locations. Typically, the storage device at each location was initially placed there for a dedicated backup function. That is, each storage device was purchase and installed so as to service a particular computer or group of computer.

However, since the storage devices and the computers that need to be backed up are frequently part of the same network, the opportunity to select a particular storage device arises.

The ability to select which one of a plurality of different storage devices is to be used for a given backup task has some advantages. For example, if the capacity of the usual storage device will be exceeded for the next backup, then a different storage device having a higher available capacity may be selected.

An operator, such as a network administrator, must typically specify where the data for a particular computer is to be backed up. Frequently, the administrator specifies that the data for a particular computer is to be backed up on a nearby storage device, which has sufficient capacity. However, this may not be the best choice for a variety of different reasons. Further, this choice may not always be available when desired. For example, the desired storage device may be out of service at the moment.

The nearest storage device to the computer being backed up may not be the best choice because a single event may destroy both the data stored on the computer being backed up and data stored on the storage device. For example, a fire that destroys the building within which both the computer being backed up and the backup storage device are located will have prevented restoring the data. Thus, it is generally desirable to backup data on a computer that is located remotely with respect to the computer being backed up.

However, in some instances it may be desirable to backup a computer to a storage device that is located near the computer. For example, the network administrator may intend to immediately remove the media from the storage device and move it to a remote location for safekeeping.

Further, an attempt to backup data on a remote storage device may result in problems due to bandwidth limitations of the network. In some instances, sufficient bandwidth may exist so as to facilitate backup within a reasonable amount of time and without undesirably interfering with the network usage of other computers. In other instances, the use of a remote storage device may result in the backup process taking an undesirably long time and/or interfering with routine network utilization.

Thus, in some instances it may again be more desirable to use a storage device that is located near the computer being backed up and in other instances it may be more desirable to use a computer located remotely with respect to the computer being backed up.

Additionally, it is generally desirable to always backup a particular computer with the same storage device. In this manner, the network administrator always knows where the backups for a particular computer are located when they are needed. Also, if all of the backups for a particular computer are on the same storage device, then the network administrator needs to restore data only from that particular storage device (rather than from a plurality of different storage devices), thus simplifying the restoration process.

Although such contemporary backup systems have proven generally suitable for their intended purposes, they possess inherent deficiencies, which detract from their overall effectiveness and desirability. For example, a network administrator must typically determine which of a plurality of different storage devices should be used to perform a given backup. The network administrator may lack sufficient information needed to make an optimal decision. Further, the network administrator may have other duties and may thus consider the performance of data backups a nuisance.

As such, although the prior art has recognized, to a limited extent, the. problem of automating backups, the proposed solutions have, to date, been ineffective in providing a satisfactory remedy. Therefore, it is desirable to provide a backup system that automatically performs storage device selection in a manner that tends to optimize predetermined criteria.

BRIEF SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. According to one aspect, the present invention comprises a method and system for backing up computer data wherein the method comprises having at least one networked computer select a storage device in a manner that enhances at least one parameter associated with the backup process.

More particularly, the present invention comprises a method for backing up data from a computer on a network, wherein the network comprises a plurality of network computers and a plurality of storage devices. The method further comprises selecting one of the plurality of storage devices in a manner that tends to optimize at least one parameter, preferably a plurality of parameters, associated with the backup process. Selecting one of the plurality of storage devices is performed by one of the network computers.

Preferably, the parameters comprise storage device related parameters and network data routing parameters. Examples of such parameters include whether or not media is loaded in the storage device, whether or not the storage device is an NDMP (Network Data Management Protocol) device, the speed of the storage device, the amount of network bandwidth required for the backup, the current network bandwidth utilization or pattern, the distance between the network computer being backed up and the storage device, the location of the storage device, the time and day during which the backup is to be performed, the available capacity of the storage device, and which particular storage device was used to perform a previous backup of the network computer.

Thus, at least one of the parameters preferably comprises whether media is loaded in the storage device. This parameter is optimized when the media is loaded in the storage device. Of course, it is generally preferred that the media already be loaded in the storage device prior to commencing the backup, such that the backup does not have to be delayed while someone loads the required media. Further, it is generally preferred to select a storage device having the media already loaded simply so that no one has to be inconvenience by loading the media.

Further, at least one of the parameters preferably comprises whether or not the storage device is an NDMP device. This parameter is generally optimized by selecting an NDMP device because data communications with an NDMP device are generally more efficiently accomplished and because the data can subsequently generally be more universally read from an NDMP device.

Further, at least one of the parameters preferably comprises the storage device's data storage speed. This parameter is generally optimized by selecting the storage device having the highest data storage speed. Typically, the backup process will be accomplished faster, and thus have less adverse impact upon the network, if the data storage speed of the storage device is higher.

Further, at least one of the parameters preferably comprises the amount of network bandwidth required for the backup and this parameter is optimized by selecting a storage device that minimizes the total amount of network bandwidth required to perform the backup. Of course, minimizing the total amount of network bandwidth required to perform the backup is desirable because it maximizes the amount of bandwidth available for routine network usage.

Further, at least one of the parameters preferably comprises the current network bandwidth pattern and this parameter is optimized by selecting a storage device that has the least impact upon the current network bandwidth pattern. That is, data flow on the network is analyzed and those data routes capable of handling additional data flow without adverse affect are given priority. By considering the current network bandwidth pattern, more bandwidth is again made available for routine network usage. Alternatively, the operating system may simply determine the routing of data flow during a backup process.

Further, at least one of the parameters preferably comprises the distance between the network computer being backed up and the storage device. This parameter is optimized by selecting a storage device that minimizes the total distance between the network computer being backed up and the storage device. Generally, minimizing the distance between the network computer being backed up and the storage device will similarly minimize the amount of network bandwidth required for the data transfer and thus make more bandwidth available for routine network usage.

Further, at least one of the parameters preferably comprises the location of the storage device and this parameter is typically optimized by selecting a storage device at a location that is different from the location of the network computer being backed up. However, this parameter may, in some instances, be optimized by selecting a computer that is at the same location as the computer being backed up. How this and other parameters are optimized is preferably configurable by a network administrator or other person.

It is worthwhile to appreciate that distance and location are two different parameters. Distance is a measurement of the physical separation of the computer and the storage device, as measured in feet for example. Location is determined by whether the computer and the storage device are in the same room or building. Thus, even thought the distance may only be a few feet, the locations may be different if a wall separates the computer from the storage device. Distance tends to be an indicator of the amount of total bandwidth required to transfer data, since as distance increases, the need to use more different portions of the network tends to increase. Location tends to be an indicator of network operator convenience, since in some instances it will be more convenient to have a backup storage device in the same room or building as the computer being backed up.

Selecting a storage device at a location that is different from the location of the network computer mitigates the likelihood that both the data on the network computer and the data on the storage device used for the backup will be simultaneously lost. That is, the likelihood that an earthquake, fire, or other catastrophe will adversely affect both the network computer being backed up and the backup storage device is substantially reduced when the network computer and the storage device are at different locations. Generally, the farther the storage device is from the network computer being backed up, the less the likelihood is that a signal catastrophe will adversely affect both.

However, as the distance between the network computer and the storage device increases, the network between them is more likely to be adversely impacted by the data transfer. That is, more of the network is likely to be undesirably involved in the data transfer. Thus, location and bandwidth usage are often at odds with one another and thus represent conflicting objectives.

Further, a network administrator may simply prefer that a local storage device be used, so that the network administrator can then more easily remove the media from the storage device and transfer it to a remote location for safekeeping.

The weighting factors applied to the parameters can be used to prioritize the parameters and thus somewhat mitigate such conflicts, as discussed below. Further, not all of the parameters need necessarily be used.

Further, at least one of the parameters preferably comprises the time and day that the backup is to be performed and this parameter is optimized by selecting a storage device such that network routing thereto has historically low bandwidth usage at the time and day of backup. That is, priority is given to the storage device that typically has surplus network bandwidth available thereto at the time and date on which a backup is desired.

Further, at least one of the parameters preferably comprises the capacity of the storage device and this parameter is optimized by selecting a storage device that has media that is almost full, if available. Generally, it is more desirable to fill up media as soon as possible, so that they can be removed from the storage device and stowed.

Further, at least one of the parameters preferably comprises which storage device was used to perform a previous backup of the network computer and this parameter is optimized by selecting the same storage device that was last used to perform a previous backup of the network computer. Generally, it is desirable that all of the backups for a particular computer be performed to the same storage device. By performing all of the backups to the same storage device, network administration is simplified. That is, it is clear where the backups for a particular computer are located.

Any desired combination of the above discussed parameters and any other desired parameters may be utilized according to the present invention. Not all of the parameter will necessarily be required in every instance.

In some instances, some of the parameters may be in conflict with one another, thus rendering some of the parameter less useful. That is, one parameter may indicate that a particular storage device should be used, while another parameter indicates that a different parameter should be used. In such instances, only one of the conflicting parameters may be used or one of the conflicting parameters may be give more weight than the other.

For example, the parameter of distance between the network computer and the storage device may be in direct conflict with the parameter of location of the storage device. The parameter of distance between the network computer and the storage device generally favors storage devices that are close to the network computer being backed up. However, the parameter of location of the storage device generally favors storage devices that are farther from the network computer being backed up. Because of the use of weighting, as discussed below, both parameters may generally be used together. However, one or both of such conflicting parameters may be omitted altogether from the selection process, if desired.

Some of the parameters discussed above may be optimized in ways contradictory to the ways discussed above or in other ways. The network administrator or other person who configures the software of the present invention can decide how the parameters are optimized. Thus, optimization of the parameters in the ways discussed above is by way of example only, and not by way of limitation.

Thus, the criteria for selection of a storage device may be custom tailored to fit a particular network, a particular backup philosophy or rule set, or merely to conform to the whims, desires or preferences of a network administrator or the like.

According to the preferred embodiment of the present invention, the storage device is selected in a manner that tends to optimize the sum of the values of a plurality of weighted parameters. Preferably, the storage device is selected in a manner that tends to optimize all of the network parameters. However, as mention above, any desired combination of network parameters may alternatively be utilized. Indeed, only a single network parameter may be utilized, if desired.

Preferably, the storage device is selected in a manner that tends to optimize the network parameters by determining a weighted value for each parameter, by summing the weighted values to provide a score, and by selecting the storage device with the greatest score. The weighted value for each parameter is preferably determined by multiplying the parameter by a weighting value according to well known principles.

The weighting values may be determined by a network administrator or other person. They may be based upon empirical information so as to tend optimize network performance, or they may be based upon preferences of the person determining them.

A media manager program preferably selects the storage device that is to be used for backing up a network computer. The media manager may be executed on the same computer that is being backed up or may be executed on any other desired computer. Typically, the media manager is run on one computer, such as a network server, and selects the storage devices to be used for backing up a plurality of different client computers.

According to the preferred embodiment of the present invention, a software core unit selects the storage device. The software core unit will typically be on the same computer as drivers for the storage device. However, the software core unit is not required to be on the same computer as drivers for the storage device.

The software core unit may be installed on a server that selects the storage device. Alternatively, the software core unit may be installed on a client that selects the storage device. Thus, either a server or a client may be configured to drive a selected storage device. Indeed, any desired combination of servers and clients may be configured to drive any desired storage devices.

The network may comprise either a client server network or a peer-to-peer network. Indeed, the network may comprise any desired type of network.

According to the preferred embodiment of the present invention, at least one computer comprises a database within which is stored at least one of the following types of data: storage device configuration; historical information regarding backups; and historical information regarding restores. This information is preferably used to determine at least some of the parameters used in the storage device selection process. This information may also serve as an aid in initially determining and/or later modifying the weighting factors.

The software core unit preferably manages a restore of data from a storage device to a computer. The software core unit is preferably the same software core unit that manages backups. The software core unit is preferably installed upon each client and server of a network that has the ability to drive a storage device.

According to another aspect, the present invention comprises a system for backing up computer data, wherein the system comprises at least one network computer or other device that is configured to select a storage device in a manner that enhances at least one parameter associated with the backup process.

According to another aspect, the present invention comprises a system for backing up computer data, wherein the system comprises a plurality of computers which cooperate to define a network and a plurality of storage devices in data communication with the network. At least one of the computers is configured to select one of the storage devices in a manner that tends to optimize at least one parameter associated with the backup process.

According to another aspect, the present invention comprises a computer readable media having data stored thereon. The data is stored on the computer readable media by utilizing a method comprising having at least one networked computer select a storage device in a manner that enhances at least one parameter associated with the backup process.

According to another aspect, the present invention comprises data stored within a storage device, wherein the data was stored by a method comprising having at least one networked computer select a storage device in a manner that enhances at least one parameter associated with the backup process.

According to another aspect, the present invention comprises a computer readable media upon which instructions are stored for performing a method for backing up data from a computer, wherein the method comprises having at least one networked computer select a storage device in a manner that enhances at least one parameter associated with the backup process.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
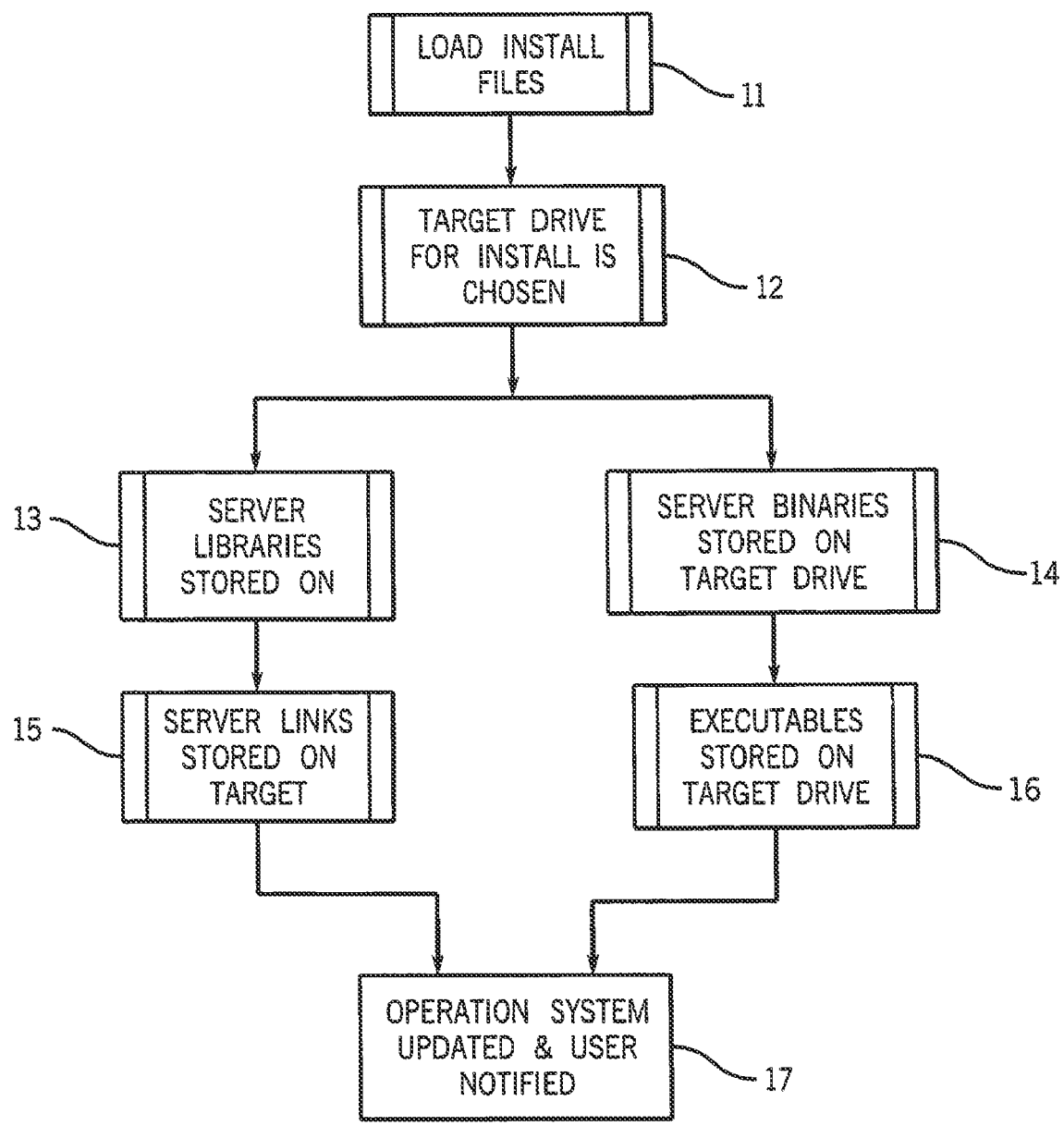
FIG. 1 is a flowchart showing an exemplary installation process for software that facilitates automatic storage device selection for backups according to the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit of the invention.

As used herein, the term network is defined to include both local area networks (LANs) and wide area network (WANs). The Internet is one example of a wide are network. Such networks include both wired and wireless networks. Thus, the present invention may be practiced on an Ethernet of a small business, on the Internet, or on any other desired network.

The present invention is illustrated in FIGS. 1-5, which depict a presently preferred embodiment thereof. Referring now to FIG. 1, the process for installing software that automatically selects a storage device for backups according to the present invention comprises loading the install files as shown in block 11. A target drive for the install is chosen as shown in block 12. The server libraries, the server binaries, the server links, and the executables are stored on the target drive as shown in blocks 13, 14, 15, and 16, respectively. The operating system is updated and the user is notified that the install is complete, as shown in block 17.

Figure 2:
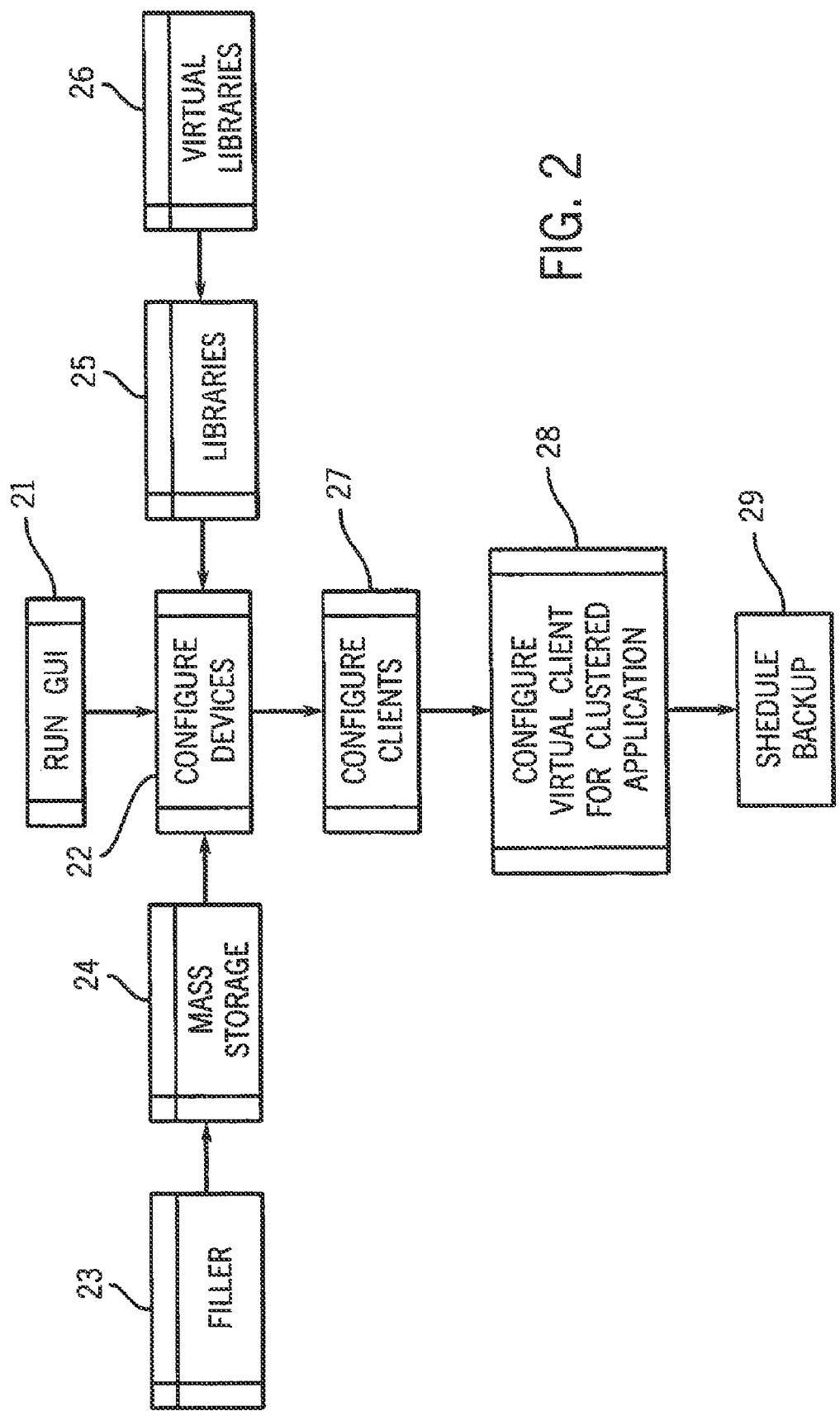
FIG. 2 is a flowchart showing an exemplary configuration process for the software of FIG. 1.

Referring now to FIG. 2, after installation is performed, then the software is configured. Preferably, a graphical user interface (GUI) is run to make the configuration user friendly, as shown in block 21. The devices are configured as shown in block 22 taking into account a filer 23 and mass storage 24 thereof, as well as the libraries 25 and virtual libraries 26.

Configuration of the devices may include configuration of the device drivers, so that they interact with the operating system and/or the software of the present invention properly.

The clients are configured as shown in block 27. Preferably, weighting factors are predetermined and are applied in software to their respective parameters. Alternatively, configuration of the clients includes determining which parameters are to be used by the software to select a storage device and also includes assigning weighting factors to those parameters.

A user may optionally be permitted to select which storage device a backup is to be performed to and automatic storage device selection then only occurs when the user fails to make the selection.

Configuration of the clients may comprise defining a backup policy for the devices. The backup policy will determine such things as what types of files are backed up and how often they are backed up.

If cluster applications are desired, then at least one virtual client is configured as shown in block 28. A virtual client may comprise a plurality of real clients that are treated identically, so as more efficiently facilitate the configuration thereof. In this manner, only a single set of configuration parameters needs to be entered in order to configure all of the actual clients that make up the virtual client.

Figure 3:
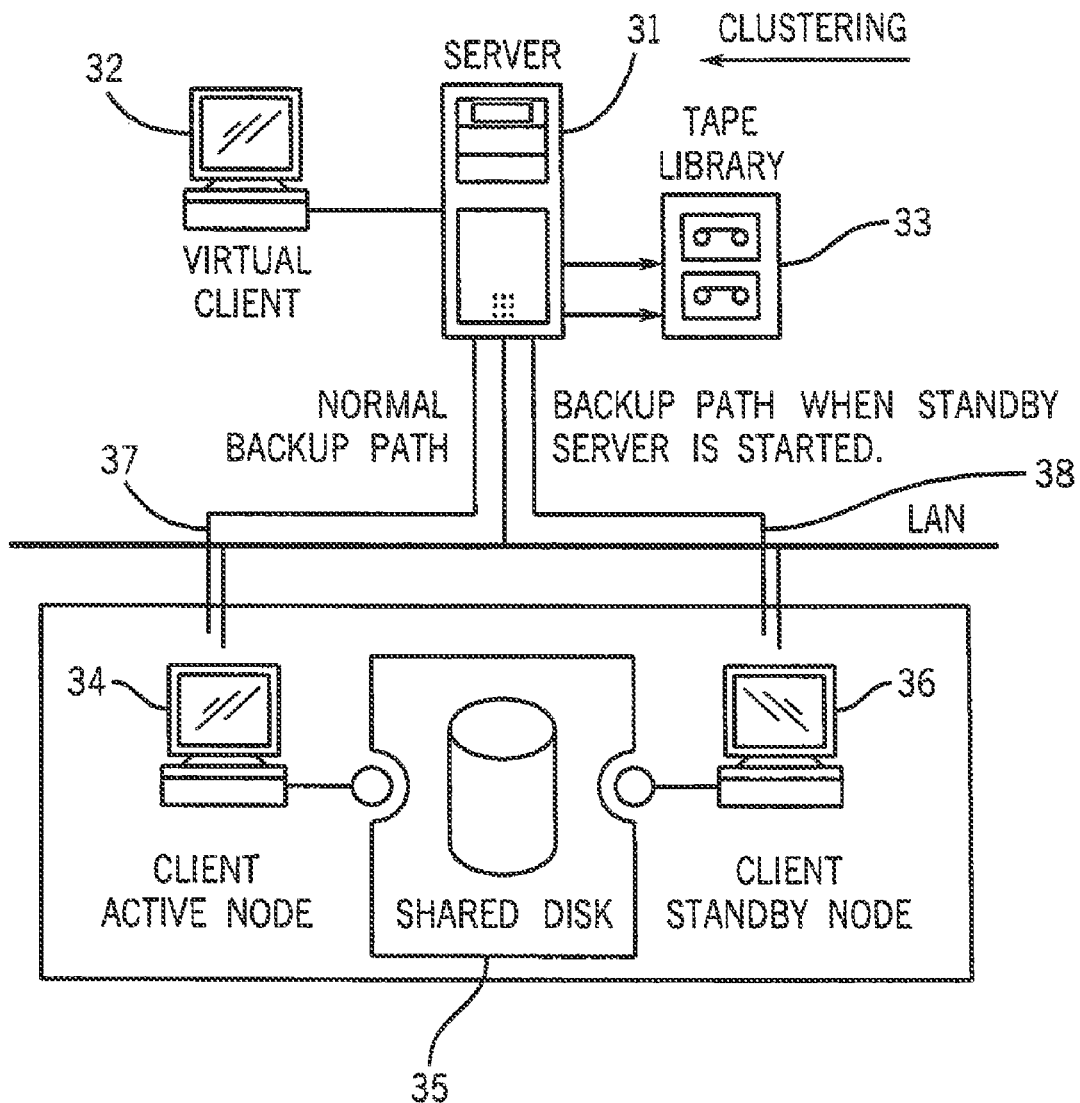
FIG. 3 is a semi-schematic block diagram showing a small client server network having plural storage devices.

Referring now to FIG. 3, a small client server network having a plurality of storage devices is shown. However, it is important to appreciate that automatic storage device selection according to the present invention may alternatively be used on a peer-to-peer network or on any other desired type of network.

A server 31 serves applications and/or data to a plurality of clients 34, 36 via the network. A plurality of storage devices, such as tape drive 33 and shared disk 35, may be selected for backup of the server 31 and any desired clients 24, 36. Indeed, any hard disk, CD, DVD, or any other storage device of any computer on the network may preferably be selectable as a storage device for backup. The storage devices which are eligible for selection as backup storage devices are preferably designated as such during the configuration of the software of the present invention.

Optionally, software associated with the backup process is capable of migrating from one computer to another computer. The virtual client 32 may optionally be used to keep track of where any such software is located at any given instant. A server may then issue a backup command, such as from a scheduling program. Once the command has been issued, the virtual client 32 assures that the command is communicated to the software needed to execute the command. The server itself is then no longer required during the performance of the backup.

The server 31, and any of the client computers 34, 36, may be backed up to any of the storage devices, such as the tape drive 33, the shared disk 35, and/or any of the installed storage devices of the server 31 and the client computers 34, 36 (such as CDs, DVDs, and/or hard disks).

Immediately prior to a backup, the software of the present invention optionally monitors network conditions and routing availability and determines the best path for routing of the backup. Alternatively, routing of the backup may be determined by the network itself (such as by the routers and/or other devices thereof), in the same manner that the network determines the routing of any data transfer. For example, the operating system may simply determine the routing of data flow during a backup process.

Figure 4:
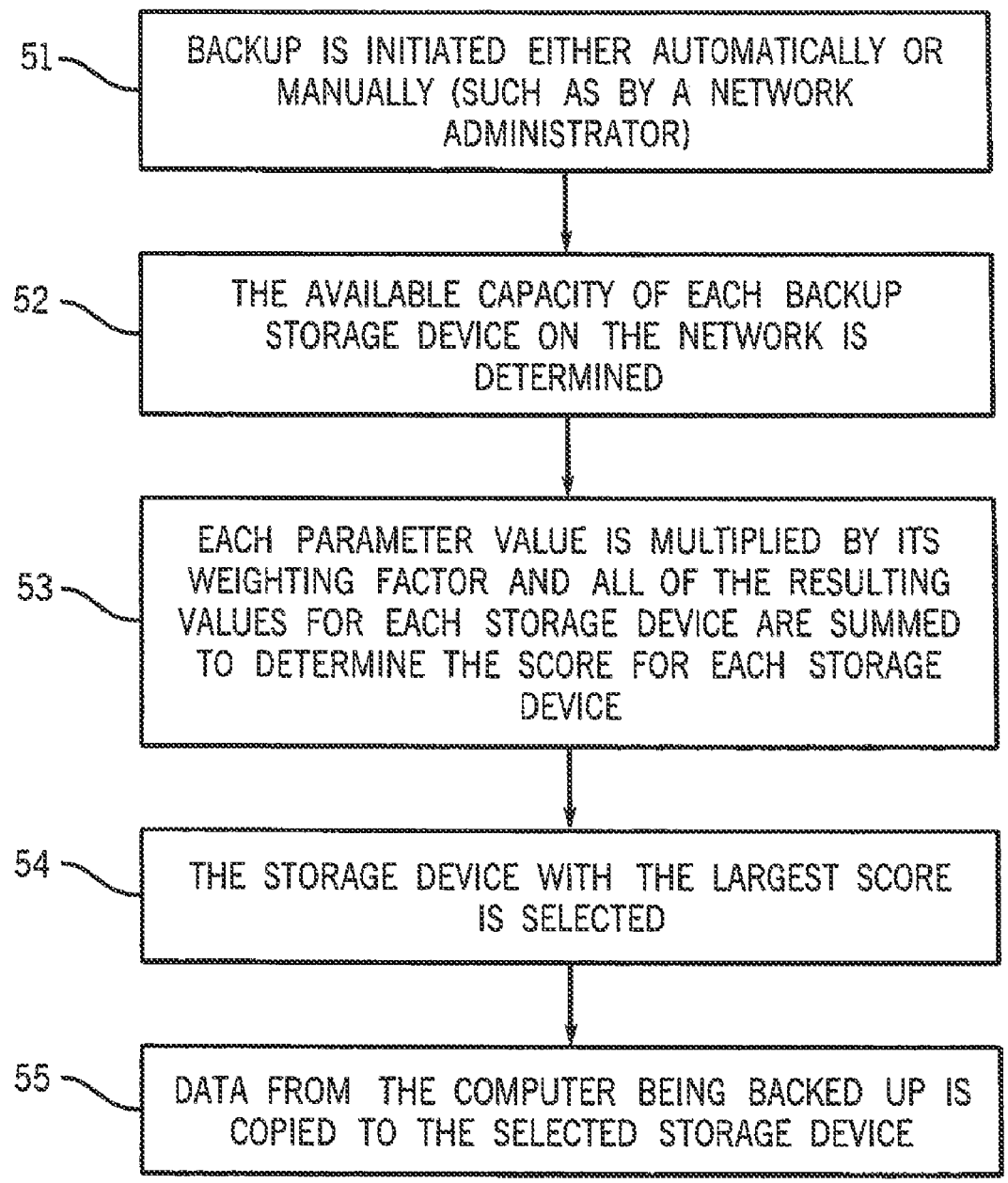
FIG. 4 is a flowchart showing an exemplary process for selecting a storage device for backing up data from a network computer, according to the present invention.

Referring now to FIG. 4, the process of selecting a storage device for backing up data from a network computer is shown. Backup is initiated either automatically or manually, as shown in block 51.

Automatic backup may be initiated by the software core unit or by any other desired scheduling program. Automatic backup may be performed periodically, such as at generally equal time intervals. Such periodic backup is typically performed at a time when backup operations are not likely to interrupt routine operations of the network. Thus, automatic backup may, for example, be performed every day at midnight.

Alternatively, backup may be performed according to some other criteria, such as the quantity of new data added to a computer since its last backup. That is, when the amount of new data added to a computer exceeds a predetermined threshold value, then that computer is backed up. Any desired combination of criteria may also be used.

Further, a computer may be backed up as the result of manually initiating the backup process. This may be done, for example, after a substantial change has been made to the computer. Thus, a computer may be backed up after new software has been installed therein.

The available capacity of each backup storage device on the network is determined as shown in block 52. The software of the present invention may make this determination by querying each storage device, by querying the operating system of a computer to which a storage device is connected, and/or by keeping track of the amount of data previously stored on the storage device and subtracting this amount from the storage device's total capacity.

Each parameter associated with a storage device which is used by the software of the present invention to select which storage device is to be used for the backup is assigned a weighting factor. An example of such parameters and weighting factors is provided in the table of FIG. 6 and their use is discussed in detail below.

The more important a parameter is to the selection process, the higher its weighting factor is. Thus, more important parameters are given more weight in the selection process. According to the present invention, each parameter value is multiplied by its weighting factor and all of the resulting values for each storage device are summed to determine a score for each storage device, as shown in block 53.

The storage device with the largest score is selected, as shown in block 54. This will be the storage device that is best suited overall to perform the backup, taking into consideration the parameters used and the importance, i.e., weighting factor, of each parameter.

After the storage device is selected, then data from the computer being backed up is copied to the selected storage device, as shown in block 55. Routing of the data during the backup process may be performed in a manner that mitigates impact to the network, as described above.

Thus, according to the present invention, a backup device is selected by determining a score for each potential storage device and by selecting the storage device with the highest score. One important parameter for determining the score of a storage device is the available capacity of the storage device. The available capacity of a storage device is the unused capacity of the media thereof. Thus, if a tape drive has a capacity of 20 gigabytes and 15 gigabytes of the tape presently installed therein are used, then the available capacity of the tape drive is 5 gigabytes.

It is generally preferable to select a storage device that has a media with a substantial amount of its capacity already used. In this manner, the media can be filled more quickly and then stored. For example, it is generally preferable to completely fill one backup tape before storing additional information on another backup tape.

However, in some instances it may be preferable to do all of the backup on a single storage device, since doing so simplifies restoring the data, if that becomes necessary. It may also be preferable to do all of the backup on a single storage device because spreading the backup across multiple storage devices increases the risk that the failure of a single storage device will prevent full restoration of a computer.

Figure 5:
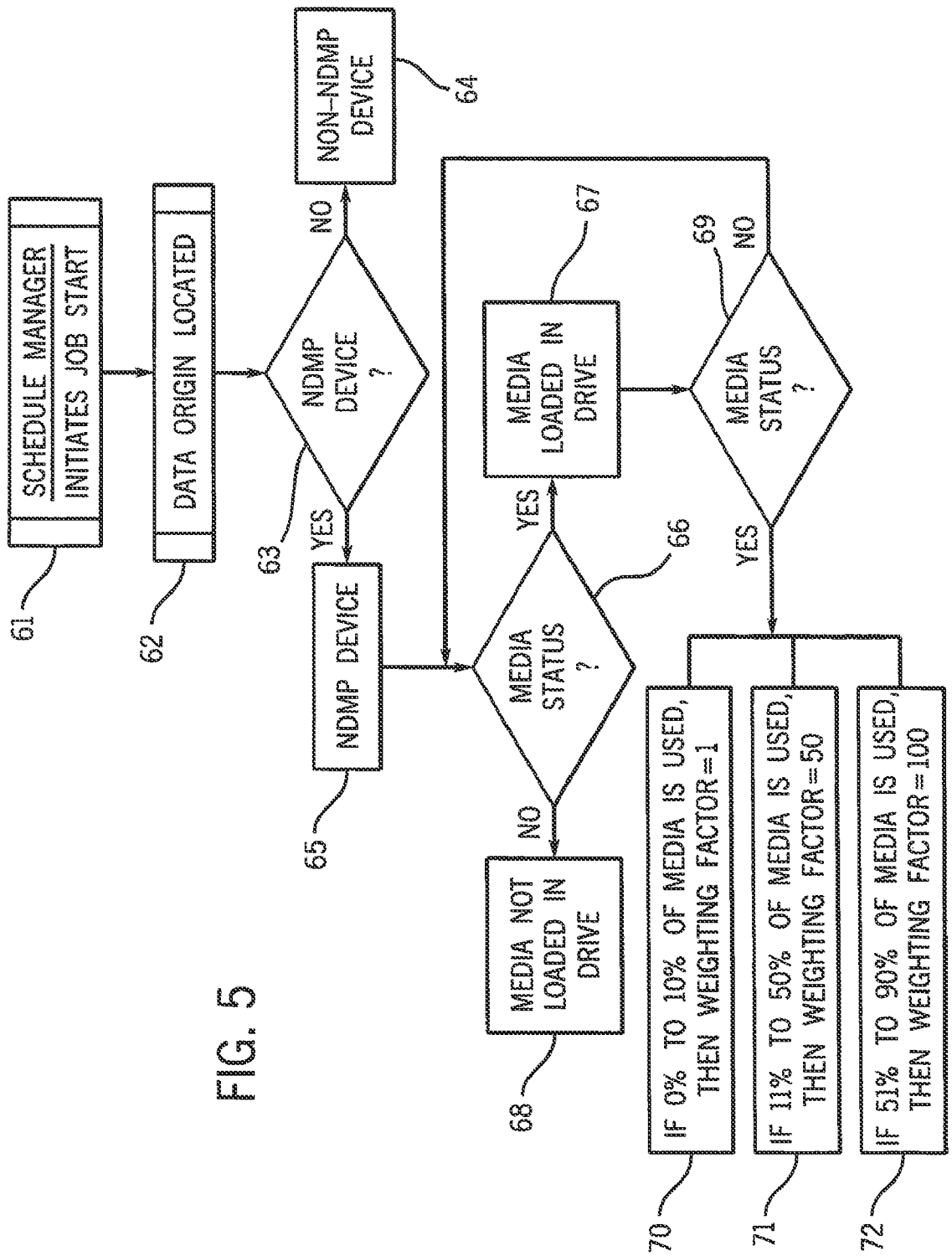
FIG. 5 is a flow chart showing the use of an exemplary parameter, i.e., capacity of the storage device, that may be used to automatically select a storage device according to the present invention.

Referring now to FIG. 5, a flow chart shows the use of an exemplary parameter, i.e., remaining media capacity of the storage device, to facilitate automatic selection of a backup storage device. A software scheduling manager program initiates a backup as shown in block 61. The scheduling manager program may initiate the backup according to a predetermined schedule as defined by a network manager, according to the amount of usage of a particular network computer (assuming that the more a computer is used, the more new data there is on the computer that should be backed up), or according to any other desired criteria.

The data origin for the backup is located as shown in block 62. The data origin is the storage device on the network computer from which data is to be backed up. The data origin may be a hard drive, for example.

A determination is made as to whether a candidate backup storage device is an NDMP device or not, as shown in block 63. If the candidate backup storage device is not an NDMP device as indicated by block 64, then the use of remaining media capacity as a parameter to facilitate automatic selection of a backup storage device may not be used. NDMP devices readily facilitate communication of such parameters as remaining media capacity thereof over the network. Other types of devices may not readily facilitate the communication of such information.

If the candidate backup storage device is an NDMP device as indicated by block 65, then media status is checked to determine of media is loaded in the backup storage device, as indicated by block 66. If media is not loaded in the drive of the backup storage device, as indicated by block 68, then the backup storage device is not considered to be a candidate for the backup operation. If media is loaded in the drive of the backup storage device, as indicated in block 67, then the media status is checked to determine the amount of the media that has been used, as shown in block 69.

The amount of media that has been used determines how much of the media is left for use in another backup. It is generally desirable to select almost full media rather than almost empty media. In this manner, there is a beneficial tendency to fill up tapes, so that they can be removed for storage and then replaced with new tapes.

Thus, according to the present invention, higher weighting factors are generally given to media that have more used capacity that to media having less used capacity. One exception to this general rule may be that at some point media can be considered too full (although not completely full) to be of practical use.

If 0% to 10% of the media is used, then a weighting factor of 1 may be applied, as shown in block 70. If 11% to 50% of the media is used, then a weighting factor of 50 may be applied, as shown in block 71. If 51% to 90% of the media is used, then a weighting factor of 100 may be applied, as shown in block 70. Of course, these values are merely exemplary and various other values are likewise suitable.

The used capacity of backup media may be divided into any desired number of ranges, instead of the three shown in blocks 70-71. In some instances, it may be desirable to use very different weighting schemes, such as when it is desirable to store a complete backup on a single tape.

The parameters and weighting factors used according to the present invention may depend upon characteristics of the network and upon the desires of the network administrator or other personnel.

For example, if the network is a small LAN that is totally contained within a small office suite, then the distance between the computer being backed up and the storage device may not be an important factor and may be weighted lightly or omitted.

Further, a network administrator may place substantial importance upon convenience. The network administrator may perceive that it is more convenient to have some backups always be done to a particular storage device, unless there is some overriding criteria, such as lack of space on that storage device.

Thus, the present invention facilitates the use of both objective and subjective parameters. A subjective parameter, such as network administrator preference, may be assigned a weight, just as an objective parameter is.

Priority can be given to Network Data Management Protocol (NDMP) devices because they more readily facilitate the transfer of data.

Priority can also be given to faster storage devices. As mentioned above, faster storage device tend to more readily accept large amounts of data during a backup process, such that the entire transfer can more likely be accomplished more quickly and with less adverse impact to the network.

It is understood that the exemplary method and system for automatic storage device selection described herein and shown in the drawings represents only presently preferred embodiments of the invention. Indeed, various modifications and additions may be made to such embodiments without departing from the spirit and scope of the invention. For example, some or all of the functionality of the present invention may be built into the firmware of a computer, storage device, router, or any other network device. Indeed, some or all of the functionality of the present invention may be built into a dedicated, stand-alone network device. Thus, various modifications and additions may be obvious to those skilled in the art and may be implemented to adapt the present invention for use in a variety of different applications.

The invention claimed is:

1. A method for backing up computer data, the method comprising:
    determining an available capacity of each storage device, wherein the available capacity is one of a plurality of backup parameters associated with each storage device, each backup parameter including a parameter value;
    assigning an available capacity weighting factor to each storage device based on its determined available capacity, wherein the available capacity weighting factor is higher for storages devices with a greater used capacity than for storage devices with a less used capacity;
    assigning a weighting factor to each of the others of the plurality of backup parameters associated with each storage device;
    for each storage device, multiplying the weighting factor by the backup parameter value for each backup parameter to determine a plurality of resulting values for each storage device;
    summing the resulting values for each storage device to determine a score for each storage device; and
    select the storage device with the largest score to receive data to be backed up from a network computer;
    wherein at least another one of the backup parameters is selected from the group consisting of:
        whether the storage device is a network data management protocol (NDMP) device;
        a speed of the storage device;
        a network bandwidth required for a backup;
        a current network bandwidth pattern;
        a distance between a network computer being backed up and the storage device;
        a location of the storage device;
        a time and day; and
        whether the storage device was used to perform a previous backup.

2. The method of claim 1 further comprising configuring at least one virtual client for clustered applications.

3. The method of claim 2 wherein the at least one virtual client includes a plurality of actual clients such that a single set of configuration parameters are used to configure the plurality of actual clients.

4. The method of claim 2 further comprising wherein the at least one virtual client keeps track of a location for software associated with a backup process when the software migrates from one computer to another computer.

5. The method of claim 1 wherein the weighting factor associated with the available capacity of the storage device optimizes selecting a storage device with 51% to 90% of media used.

6. A system for backing up data from a computer on a network, the system comprising:
    a network including a plurality of network computers and a plurality of storage devices, each storage device associated with backup parameters, each backup parameter including a backup parameter value;
    computer hardware including at least one computer processor; and
    computer-readable storage including computer-executable instructions that, when executed by the computer processor, cause the computer hardware to perform operations defined by the computer-executable instructions, the computer executable instructions configured to:
    assign a weighting factor to each of the backup parameters;
    for each storage device, multiply the weighting factor by the backup parameter value for each backup parameter to provide a plurality of resulting values associated with each storage device;
    sum the plurality of resulting values for each storage device to determine a score for each storage device; and
    select the storage device with the largest score to receive data to be backed up from the network computer;
    wherein one of the backup parameters for each storage device is an available capacity of the storage device and higher weighting factors are assigned to storage devices with more used capacity than to storage devices with less used capacity; and
    wherein at least another one of the backup parameters is selected from the group consisting of:
        whether the storage device is a network data management protocol (NDMP) device;
        a speed of the storage device;
        a network bandwidth required for a backup;
        a current network bandwidth pattern;
        a distance between a network computer being backed up and the storage device;
        a location of the storage device;
        a time and day; and
        whether the storage device was used to perform a previous backup.

7. The system of claim 6 wherein the weighting factor associated with whether media is loaded in the storage device optimizes selecting a storage device having media loaded thereon.

8. The system of claim 6 wherein the computer executable instructions are further configured to configure at least one virtual client for clustered applications.

9. The system of claim 8 wherein the at least one virtual client includes a plurality of actual clients such that a single set of configuration parameters are used to configure the plurality of actual clients.

10. The system of claim 8 wherein the computer executable instructions are further configured to migrate for execution at a different location, the at least one virtual client configured to keep track of the different location.

11. The system of claim 6 wherein the weighting factor associated with the available capacity of the storage device optimizes selecting storage devices with 51% to 90% of media used.

12. The system of claim 6 wherein the weighting factor associated with the available capacity of the storage device optimizes selecting storage devices with more used capacity than storage devices with less used capacity.

13. The system of claim 6 wherein the weighting factor associated with the available capacity of the storage device optimizes not selecting storage devices with greater than 90% of media used.

14. The system of claim 6 wherein the weighting factor associated with the available capacity of the storage device optimizes not selecting storage devices with 0% to 10% of media used.

15. The system of claim 6 wherein the computer executable instructions are further configured to determine the available capacity of each storage device.

16. A system for backing up data from a computer on a network, the system comprising:
   a network including a plurality of network computers and a plurality of storage devices, each storage device associated with backup parameters, each backup parameter including a backup parameter value, wherein at least one of the backup parameters is an available capacity of the storage device backup parameter;
   computer hardware including at least one computer processor; and
   computer-readable storage including computer-executable instructions that, when executed by the computer processor, cause the computer hardware to perform operations defined by the computer-executable instructions, the computer executable instructions configured to:
      determine the available capacity of each storage device;
      assign a weighting factor to each storage device based on its determined available capacity, wherein the weighting factor is greater for storages devices with more used capacity than for storage devices with less used capacity;
      assign a parameter value to the available capacity of the storage device backup parameter;
      for each storage device, multiply the weighting factor by the backup parameter value to determine a score for each storage device; and
      select the storage device with the largest score to receive data to be backed up from the network computer;
      wherein at least another of the backup parameters is selected from the group consisting of:
         whether the network storage device is a network data management protocol (NDMP) device;
         a speed of the network storage device;
         network bandwidth required for a backup;
         a current network bandwidth pattern;
         a distance between a network computer being backed up and the network storage device;
         a location of the network storage device;
         a time and day; and
         whether the network storage device was used to perform a previous backup of the network computer.

17. The system of claim 16 wherein the computer executable instructions are further configured to determine the available capacity of the storage device when the storage device is a network data management protocol (NDMP) device.

18. The system of claim 16 wherein the weighting factor optimizes selecting a storage device having a lower available storage capacity.

19. The system of claim 16 wherein the computer executable instructions are further configured to configure at least one virtual client for clustered applications, the at least one virtual client includes a plurality of actual clients such that a single set of configuration parameters are used to configure the plurality of actual clients, the at least one virtual client is configured to keep track of a different location when the computer-executable instruction migrate for execution at the different location.

20. The system of claim 16 wherein the weighting factor optimizes not selecting storage devices with greater than 90% of media used.

\* \* \* \* \*